XR 2,951,736 SR

SEARCH ROOM

SUBSTITUTE FOR MISSING XR

INVENTOR:
GEORGE S. BLACK
BY Newell Pottorf
ATTORNEY

INVENTOR:
GEORGE S. BLACK
BY Newell Pottorf
ATTORNEY

United States Patent Office 2,951,736

Patented Sept. 6, 1960

2,951,736

VARIABLE-DENSITY RECORDING OF MULTIPLE SIGNAL TRACES

George S. Black, Tulsa, Okla., assignor to Pan American Petroleum Corporation, Tulsa, Okla., a corporation of Delaware Filed Aug. 21, 1958, Ser. No. 756,401

1 Claim. (Cl. 346—1)

This invention relates to multiple-trace variable-density recording and is directed particularly to a method and apparatus for equalizing or compensating for unequal zero-signal densities on the various multiple traces. While the invention may be described with reference to the recording of seismic waves in the form of variable-density traces, it will be apparent that it is applicable to the multiple-trace variable-density recording of other types of data.

In the recording of a plurality of alternating-current signals simultaneously in the form of variable-density traces, it frequently happens that the intermediate value of density which represents zero A.C. signal amplitude differs from trace to trace in a random fashion. For example, in variable-density recording of seismic waves, at the beginning of a record before the receipt of the first arrivals—i.e., where the A.C. signal amplitude is zero—some of the traces are often noticeably lighter or darker than others. This condition is undesirable, especially when a number of traces or records are placed side by side to form a cross-section, as the random changes in density from trace to trace interfere with the visual comparison of the different traces. In the electrical playback of such records, zero-signal density differences may be one cause of signal distortion, particularly at high levels of modulation.

In variable-density recording and reproducing systems, such differences in zero-signal trace density may be due to any one or more of several causes. The light sources which photographically expose the traces may have unequal intensities; or their intensities, originally equal, may vary unequally with age and use. The electronic circuits which transform the signals into variations of light intensity, or otherwise modulate the light beam photographically forming each of the plurality of traces, may drift or change their characteristics with time. The optical elements in the light paths between the light sources and the film in an original recording, or between the recorded film and another film in photographic reproduction, may not all transmit light equally.

Regardless of the cause for and amount of such differences of zero-signal light intensity, it is a primary object of my invention to provide a method and apparatus for compensating or correcting for such differences in variable-density recording and reproducing systems. It is a further object to provide a method and apparatus for correcting for such differences in a relatively simple and easy manner and as nearly completely as may be desired. A still further object is to provide a method and apparatus for making such corrections in a form and manner applicable to any part of a variable-density recording system or to the entire recording and reproducing system as a whole. Other and further objects, uses, and advantages of the invention will become apparent as the description proceeds.

Stated briefly, the foregoing and other objects are accomplished by exposing a photographic film to the unbalanced light intensities to be compensated. These unbalanced light intensities can be either the beams from light sources modulated in making an original recording, or they can be the scanning beams passing through the various traces of an original or other record in a reproducer. The film is then, after photographic processing, interposed as a neutral-density filter in the various light beams passing to the respective trace positions on the record-receiving photographic medium on which the equalized or compensated variable-density record is to be printed. The exposure of the compensated record is then made through this filter, with the signal-varying light intensities being transmitted through each corresponding trace position of the filter and thence to the corresponding trace position of the final record. In other words, a negative film made by the unequal light intensities to be compensated becomes the correction filter for these light intensities in making a density-balanced film or print.

The making of this correction filter or film can be carried out in a single step, if sufficiently close control is exercised over the exposure and development of the film, or if only approximate correction is desired. As a rule, however, it is simpler to carry out the process in two steps, making a first correction filter or film which gives only an approximate correction, with some error remaining in the direction of either over or under-correction. In the second step an additional correction film or filter is made, with the first filter in place, to take care of the residual errors in the first. After similar processing, the two correction films are superimposed and together inserted in the light paths by which the final density-compensated traces are to be photographically exposed.

This will be better understood by reference to the accompanying drawings forming a part of this application and illustrating diagrammatically certain typical embodiments of the invention. In these drawings, Figure 1 is a schematic diagram of a three-channel variable-density recording system;

Figure 1:
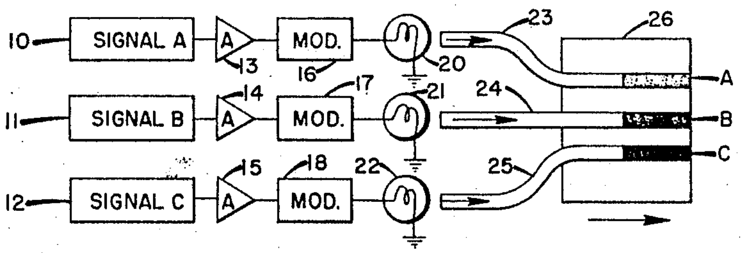

Referring now to these drawings in detail, and particularly to Figure 1 thereof, a three-trace variable-density recording system is shown in simplified form. Thus, there are three signal sources, 10, 11, and 12, respectively supplying signals A, B, and C. In seismic geophysical surveying, the sources 10, 11, and 12 might comprise seismometers or seismometer groups whose respective outputs are to be recorded as the separate variable-density traces A, B, and C. The outputs of signal sources 10, 11, and 12 are respectively amplified by amplifiers 13, 14, and 15 which drive the respective modulators 16, 17, and 18. These modulators in turn act upon the respective light sources 20, 21, and 22 to vary the light outputs thereof above and below an intermediate value, in accordance with positive and negative values of the respective signals. Light outputs from the sources 20, 21, and 22 are carried by the light-transmitting members 23, 24, and 25, respectively, to the surface of a record-receiving medium 26 on which the traces A, B, and C are respectively photographically exposed. It will be understood that the traces A, B, and C, as shown in Figure 1, include for illustrative purposes the effect of subsequent photographic processing for development and fixation of the exposed film 26.

For purposes of illustration, it may be assumed that the outputs of the signal sources 10, 11, and 12 are zero, so that the traces A, B, and C of record 26 represent an intermediate value of density corresponding to zero signal amplitude. As is commonly the case, however, the density of traces A, B, and C is not uniform but varies somewhat from trace to trace in an arbitrary manner. Such density variations may be due to any one or more of several causes. The electronic circuits of the modulators 16, 17, and 18 may not be exactly aligned, or if once aligned and equalized, may drift as the electronic circuit elements age. Similarly, the light outputs of the light sources 20, 21, and 22 may differ, either initially or with aging of the filaments and the like. In a similar way, the light-transmission means 23, 24, and 25 which convey light from each respective light source to the proper trace position on record 26 may not transmit light with equal efficiencies, even though the light sources and modulators are properly equalized or aligned.

Figure 2:
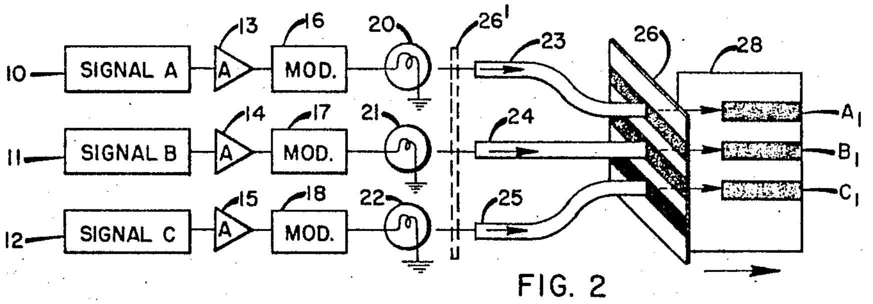
Figure 2 is a schematic diagram showing the application of an embodiment of the invention to the system of Figure 1.

Regardless of the cause of the zero-signal density variations on the record 26, they may be readily compensated in the manner shown in Figure 2. This corresponds to the recording system in Figure 1 in all respects except that the record 26 or an equivalent record is now interposed between the light sources 20, 21, and 22 and the final film 28 on which the equalized traces $A_1$, $B_1$, and $C_1$ are to be exposed. Thus, the unequal-density record 26 or its equivalent becomes the correction filter for all of the inequalities in the different channels of the variable-density recording system. It will be understood that in making the corrected record 28 it is necessary to compensate in some way for the absorption of light by the filter 26. Thus, in order to produce a correct exposure of the final film 28, the zero-signal light output of the sources 20, 21, and 22 can be correspondingly increased or the speed of translation of the film 28 decreased by a proper amount or by a combination of both adjustments. Alternatively, the correction film 26 can be made with reduced light intensity while the final film 28 is made with normal light outputs.

The manner of preparation of the correction film 26 is of considerable importance. The exact exposure given to the film 26 is non-critical as long as the densities of traces A, B, and C fall along the straight-line portion of the H and D, or characteristic, curve of the film 26. This curve is also frequently referred to as the D—$\log_{10}E$ curve, where D is the density produced by an exposure E. It is preferred, of course, that these densities occur along the lower portion of the curve, as a smaller increase in exposure is required to produce the final record 28. The processing of the exposed film 26 is more critical, however. As nearly as possible, the film is developed to a gamma of unity; i.e., a tenfold change in exposure E produces a change in density of 1.0, or unity. When this is done, the use of the film as a neutral-density filter, as in Figure 2, makes an exact compensation for the different light intensities emerging from the transmission units 23, 24, and 25, so that the equalized traces $A_1$, $B_1$, and $C_1$ are obtained.

It is not necessary that the filter 26 in Figure 2 be placed in the exact position shown, next to the film 28; but it is satisfactory to place it anywhere in the light paths between the sources 20, 21, and 22 and the film 28. It is essential only that the light from source 20 pass through trace A of the film 26, that from source 21 through trace B, and that from source 22 through trace C. Thus, the correction film 26 might be placed in the position indicated by the dashed line 26′, and identical results in the form of the corrected film 28 would be achieved.

Figure 3:
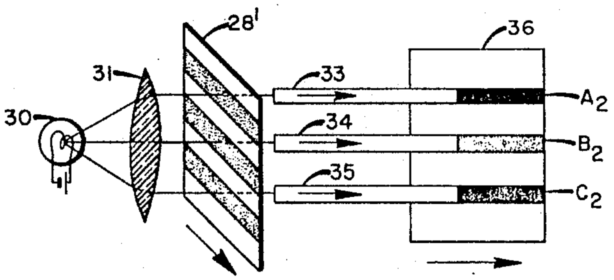
Figure 3 is a schematic diagram of a variable-density reproducing system.
Figure 4:
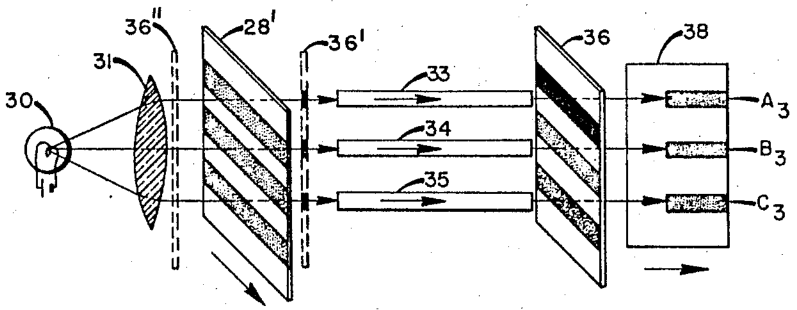
Figure 4 is a schematic diagram of a reproducing system of the type of Figure 3, showing the application of the invention thereto.

The manner of applying the invention to a reproducing or variable-density playback system is illustrated in Figures 3 and 4. In Figure 3, for example, light from a source 30, focused by a lens 31, passes through a film 28′ carrying the traces to be reproduced and is conveyed by the respective transmission units 33, 34, and 35 to a film 36 on which the reproduced traces $A_2$, $B_2$, and $C_2$ are to be photographically printed. In transcribing records of seismic data in this way it is a common practice to move one or both of the ends of the light-transmission means 33, 34, and 35 in the direction of trace extension in order to produce the effect of a lengthwise shifting of some of the traces $A_2$, $B_2$, and $C_2$ relative to the others. It frequently occurs, however, that the light-transmission means 33, 34, and 35 do not all transmit light equally and, accordingly, the zero-signal densities of the traces $A_2$, $B_2$, and $C_2$ may vary in a random manner in spite of the fact that the corresponding traces of the record 28′ have substantially equal zero-signal trace densities. Whether this equalization of trace densities on the record 28′ has been achieved as described in Figures 1 and 2 or in some other way is immaterial as regards Figures 3 and 4.

As is indicated by the latter figure, the record 36, given a proper exposure and developed to a gamma of unity, is interposed, with matching of corresponding traces and light beams, in the respective light paths between the source 30 and the final record 38 on which the equalized traces $A_3$, $B_3$, and $C_3$ are to be printed. When used in this manner the greater density of the trace $A_2$, for example (due to the increased efficiency of transmission of the unit 33), reduces the amount of light from the unit 33 which generates the trace $A_3$ by just the correct amount to produce a final density after development equal to that of traces $B_3$ and $C_3$.

As with Figure 2, it will be understood that the intensity of light source 30 must be correspondingly increased in making the record 38 in Figure 4, or alternatively must be reduced to make the record 36 in Figure 3, assuming equal rates of translation of the films 36 and 38. Also, as in Figure 2, it is immaterial in what portion of the light beams the correction film 36 is placed between the source 30 and the film 38, so that it may be located at the positions 36′ and 36″ on either side of the film 28′, and the results produced on the record 38 will be identical.

Figure 5:
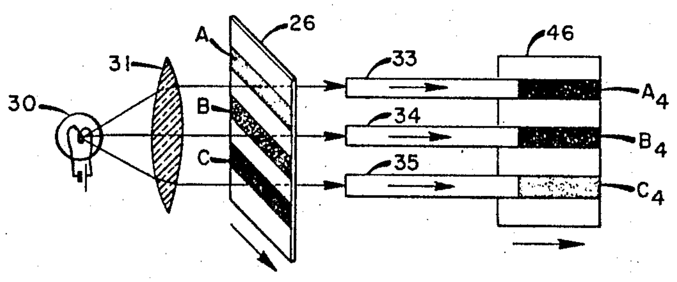
Figure 5 is a schematic diagram of a reproducing system similar to Figure 3.
Figure 6:
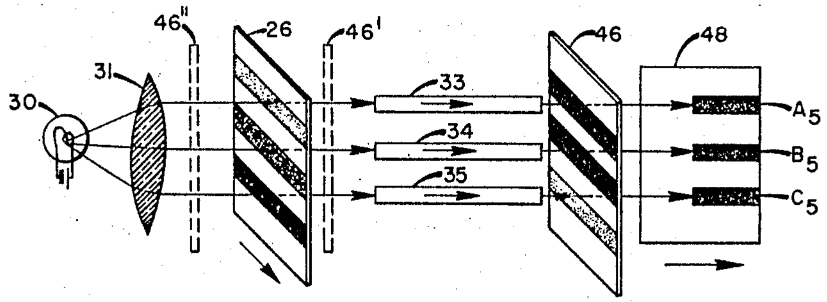
Figure 6 is a schematic diagram of a reproducing system embodying the invention as applied to Figure 5.

It is not necessary in the practice of the invention that the record 28′ being reproduced have equal zero-signal trace densities, as in Figure 4. In Figures 5 and 6 is illustrated the operation of the invention as it applies to a field record 26 on which the densities of the traces A, B, and C are unequal as in Figure 1. If such a record is reproduced with a light source 30 and collimating lens 31 by transmission of light beams through the transmission units 33, 34, and 35 which are in themselves of unequal efficiency, a further degree of unbalanced density of the traces may result, such as the traces $A_4$, $B_4$, and $C_4$ of the record 46. If this record 46 is properly exposed and developed, however, it becomes useful as a correction filter in exactly the same way as records 26 and 36 of Figures 2 and 4.

In other words, by exposing the film 46 so that the densities of traces $A_4$, $B_4$, and $C_4$ fall along the straight-line portion of the film characteristic curve, and by carrying the development of the record substantially to a gamma of unity, the film 46 may then be interposed in the reproducing system as the position 46, 46′, or 46″ of Figure 6, and the final record 48 will have the substantially equalized-density traces $A_5$, $B_5$ and $C_5$. It will, of course, be understood that the light intensity and/or the speed of translation of the films 46 and 48 must also be manipulated so that the densities $A_5$, $B_5$ and $C_5$ fall on the straight-line portion of the H and D curve of the film 48, preferably near its center.

As the variations of zero-signal trace density are ordinarily not great enough to occupy a wide portion of the straight-line part of the H and D curve, making a satisfactory exposure of the correction films 26, 36, or 46 offers no great difficulty. It is, however, more difficult to stop the development process at exactly a gamma of unity. The necessity of accurately controlling the latter step of the process is obviated in the manner shown in Figure 7. Thus, if the record 48 of Figure 6 still shows appreciable differences of zero-signal trace density, the film 48 is superimposed upon or used in series with the film 46 in the manner shown in Figure 7. Thus, any residual differences of density in the film 48 become the means of correcting themselves so that the final record 58, made with the field-record traces of record 26 exposed through both of the films 46 and 48 in series, will have substantially uniform density on the traces $A_6$, $B_6$, and $C_6$. Consequently, if the development is carried to a value of gamma which is only approximately equal to unity for both of films 46 and 48, the resultant densities of the two films will add together to approximate the densities of a single film developed very closely to a gamma of unity.

The following numerical table will serve as an example of the manner in which this invention operates:

| Trace | A | B | C |
|---|---|---|---|
| Trace Density $D_1$ (for zero signals) | .8 | 1.0 | 1.2 |
| Opacity $O_1$ (where $D_1=\log_{10}O_1$) | 6.25 | 10 | 16 |
| Transparency $T_1$ in percent $(=\frac{1}{O_1}$, which determines relative exposure by light through trace) | 16% | 10% | 6.25% |
| Now, expose correction film to these light intensities for given time to get an Exposure=E | .61 | .38 | .24 |
| $\log_{10}E$ (to which $D_2$ is proportional) | $\bar{1}.78$ | $\bar{1}.58$ | $\bar{1}.38$ |
| Density $D_2$ (after development to $\gamma=1$) | 1.2 | 1.0 | .8 |
| Total Density, both films ($=D_1+D_2$ for each trace) | 2.0 | 2.0 | 2.0 |

Figure 7:
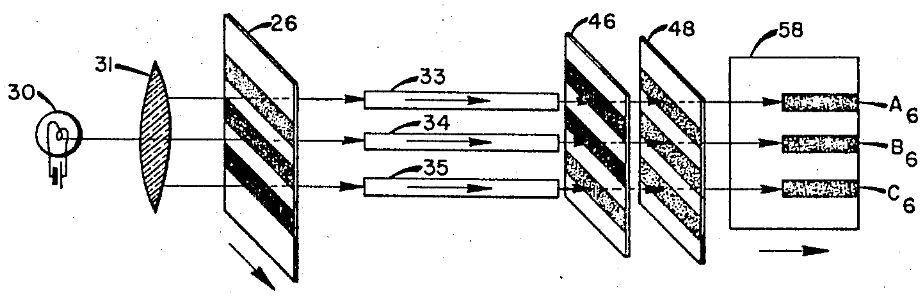
Figure 7 is a schematic diagram of a reproducing system showing a preferred embodiment of the invention applied thereto.

In one apparatus operated in accordance with the embodiment shown in Figure 7 the following will serve to indicate the manner of operation: The light source 30 employed was a 250-watt Photoflood bulb. The first correction filter 46 was produced by exposing the film 46 through a zero-signal portion of the field film 26 and the reproducer light-transmission units 33, 34, and 35, with a voltage of 50 volts applied to the lamp 30. Then, with the first correction filter in place as filter 46 in Figure 6, the exposure of the second correction filter 48 was made with a lamp voltage of 80 volts. Finally, in making fully compensated records 58 with both of the filters 46 and 48 superimposed and in place as in Figure 7, a normal lamp voltage of 110 to 115 volts was used. The exposure time, in this case determined by the rate of translation of the films 46, 48, and 58, remained substantially constant for the different steps of the procedure.

Instead of varying the output of source 30 by changing its voltage in this way, it will be understood that it can also be controlled in any of several other ways, for example by interposing one or more filters of uniform allover density in all of the light paths at some point between the source 30 and the final film 46, 48, or 58 being exposed.

Also, it will be understood that densities lying outside of the linear portion of the film characteristic can be compensated in this way, although some A.C. signal distortion will remain. Likewise, if the densities of the first correction filter 46 should fall on a curved rather than the straight-line portion of the film characteristic, the second correction filter 48 can correct for this as well as for errors in development such that gamma has a value other than unity.

While my invention has thus been described with reference to the foregoing embodiments and modifications thereof, it is to be understood that it is not limited thereto, but further modifications will now be apparent to those skilled in the art. The scope of the invention, therefore, should not be considered as limited to the details described but is properly to be ascertained from the appended claim.

I claim:

In variable-density multiple-trace photographic recording, the method of substantially completely equalizing the zero-signal trace densities of the various multiple traces which comprises the steps of exposing a first photographic film to the unequal zero-signal light intensities by which the respective multiple traces of a final record are to be exposed, for a time sufficient to produce, after development, densities on said first film lying on the straight-line portion of the film characteristic, developing said first film to an approximate gamma of unity, interposing said first film as a neutral-density filter between said unequal light intensities and a second photographic film, exposing said second film to said unequal light intensities, each as modified by the corresponding density produced thereby on said first film, for a time sufficient to produce, after development, densities on said second film lying on the straight-line portion of said second film characteristic, developing said second film to an approximate gamma of unity, and utilizing both said first and second films together as a neutral-density filter between said unequal light intensities and a third photographic film on which a variable-density record is to be printed, while exposing said third film to the respective signal-varying light intensities to produce the respective multiple traces.

References Cited in the file of this patent

UNITED STATES PATENTS

| | | |
|---|---|---|
| 1,953,471 | Erich | Apr. 3, 1934 |
| 2,267,356 | Ritzmann | Dec. 23, 1941 |
| 2,638,402 | Lee | May 12, 1953 |

OTHER REFERENCES

"Theory of the Photographic Process," by Mees, copyright 1954, chapter 5. (Div. 60).